(12) United States Patent
Wasserman et al.

(10) Patent No.: US 6,943,797 B2
(45) Date of Patent: Sep. 13, 2005

(54) EARLY PRIMITIVE ASSEMBLY AND SCREEN-SPACE CULLING FOR MULTIPLE CHIP GRAPHICS SYSTEM

(75) Inventors: Michael A. Wasserman, Redwood City, CA (US); Ewa M. Kubalska, San Jose, CA (US); Brian D. Emberling, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 52 days.

(21) Appl. No.: 10/611,271

(22) Filed: Jun. 30, 2003

(65) Prior Publication Data

US 2004/0263520 A1 Dec. 30, 2004

(51) Int. Cl.[7] .................................................. G06T 1/20
(52) U.S. Cl. ....................... 345/506; 345/505; 345/519; 345/418
(58) Field of Search ................................. 345/501, 502, 345/505, 506, 555, 426, 427, 614, 620, 418, 519

(56) References Cited

U.S. PATENT DOCUMENTS

| 6,018,353 | A  | * | 1/2000  | Deering et al. ............. 345/537 |
| 6,417,858 | B1 | * | 7/2002  | Bosch et al. ................ 345/426 |
| 6,650,327 | B1 | * | 11/2003 | Airey et al. ................. 345/422 |
| 6,717,577 | B1 | * | 4/2004  | Cheng et al. ............... 345/419 |
| 6,816,161 | B2 |   | 11/2004 | Lavelle et al. |

OTHER PUBLICATIONS

"PixelFlow: High–Speed Rendering Using Image Composition" by Molnar et al, Computer Graphics, 26, Jul. 1992, pp. 231–240.*

U.S. Appl. No. 10/989,599, filed Nov. 16, 2004, Wasserman et al.

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

A multi-chip system and method are disclosed for incorporating a primitive assembler in each of one or more geometry chips and one or more rasterization chips. This system may allow per-primitive operations to be performed in the geometry chips, and also allow use of a vertex data interface for sending vertex data to the rasterization chips. The primitive assemblers in the geometry chips may assemble vertices into primitives for clipping tests. The geometry chips may also test an assembled primitive against the projected boundaries of a set of screen space regions, where each region is assigned to one of the rasterization chips. Those primitives residing in more than one region may be sub-divided into two or more new primitives so that each new primitive resides in only one screen space region. The geometry chip may then send the vertex data for each primitive to the corresponding rasterization chip.

22 Claims, 19 Drawing Sheets

EARLY PRIMITIVE ASSEMBLY AND SCREEN-SPACE CULLING FOR MULTIPLE CHIP GRAPHICS SYSTEM

BACKGROUND OF THE INVENTION

1. Field of the Invention

This invention relates generally to the field of computer graphics and, more particularly, to a high performance graphics system.

2. Description of the Related Art

High performance graphics systems may include a floating-point processor (geometry chip) that performs operations such as transformation and lighting, and a rasterization chip that performs operations such as primitive assembly, clipping, and rasterization of primitives.

Graphics APIs support the use of a number of primitives that are composed of vertices such as triangles, quadrangles, and polygons, and sets of primitives such as triangle strips and triangle fans. Most graphics accelerators sub-divide the higher order primitives (strips, fans, quadrangles, and polygons) into triangles and then rasterize the triangles.

Some operations are performed on each vertex, and some operations are performed on assembled triangles. Primitive assembly may be performed in the rasterization chip. This may reduce the amount of data transferred between chips since a vertex may be used in more than one triangle and that vertex need only be transmitted once, but may be reused one or more times. However, primitives requiring clipping would be returned to the geometry chip and may disrupt the efficiency of its processes. Primitive assembly may be performed in the geometry chip instead to enable a more efficient clipping operation. However, this easy access for per-primitive operations (such as clipping) would require more bus bandwidth to send all three vertices for every triangle to the rasterization chip.

SUMMARY

Incorporating a primitive assembler (also referred to herein as a primitive assembly unit) in both the geometry chip and the rasterization chip may provide a new solution to the problems outlined above. A multi-chip system and method are disclosed for incorporating a primitive assembler in each of one or more geometry chips and one or more rasterization chips. This system may allow per-primitive operations to be performed in the geometry chips, and also allow use of geometry compression of vertex data when sending vertex data to the rasterization chips. Geometry compression provides a method for sending data for a vertex only once, even if it resides in more than one primitive. The primitive assemblers in the geometry chips may assemble vertices into primitives for clipping tests. The geometry chips may also test an assembled primitive against the projected boundaries of a set of screen space regions, where each region is assigned to one of the rasterization chips. Those primitives residing in more than one region may be sub-divided into two or more new primitives so that each new primitive resides in only one screen space region. The geometry chip may then send the vertex data for each primitive to the corresponding rasterization chip.

The multi-chip system may include a rendering engine that may incorporate one or more rendering pipelines. In one set of embodiments, a multi-chip rendering pipeline may include a geometry engine (also referred to herein as a media processor) with at least one first primitive assembly unit, where the first primitive assembly unit may assemble a first stream of vertices into first primitives, and where the geometry engine may apply per-primitive operations on the first primitives to generate second primitives and to output a second stream of vertices comprising vertices of the second primitives. The geometry engine may also include additional units to perform per-vertex operations such as a transformation unit and a lighting unit to perform per-vertex operations on the vertices of the first stream, and perform per-vertex operations to any new vertices of the second primitives. These additional units may be programmable. Per-primitive operations may include primitive clipping operations with respect to the edges of a screen, a viewport, or one or more windows or stencils.

The multi-chip rendering pipeline may also include a rasterization processor (also referred to herein as a rendering unit) with one or more second primitive assembly units. The second primitive assembly units may re-assemble the second stream of vertices into second primitives. The rasterization processors also receive the second stream of vertices, rasterize the second primitives to generate sample data, and output the sample data to a memory. The sample data may be usable to determine a displayable image.

In another set of embodiments, the geometry chip may test an assembled primitive against the projected boundaries of a set of screen space regions, where each region is assigned to one of the rasterization chips. Those primitives residing in more than one region may be sub-divided into two or more new primitives so that each new primitive resides in only one screen space region. The geometry chip may then send the vertex data for each primitive to the corresponding rasterization chip.

A multi-chip system that utilizes this process may include a plurality of rasterization processors (where each of the rasterization processors renders primitives for an assigned screen space region, and where each assigned screen space region is one of a plurality of specified non-overlapping screen space regions) and one or more geometry engines coupled to the plurality of rasterization processors.

A geometry engine may assemble vertices from a first vertex data stream into primitives and then sub-divide a primitive into two or more new primitives, if the primitive maps onto more than one screen space region. Each of the new primitives maps onto only one screen space region. The geometry engine outputs a different vertex data stream to each rasterization processor, where each vertex data stream comprises vertices from primitives that map onto the corresponding screen space region assigned to the receiving rasterization processor.

Each rasterization processor may receive vertices corresponding to the assigned screen space region, assemble the vertices into primitives, render the primitives into samples, and output the samples to a memory corresponding to the assigned screen space region.

BRIEF DESCRIPTION OF THE DRAWINGS

A better understanding of the present invention can be obtained when the following detailed description is considered in conjunction with the following drawings, in which.

Figure 1:
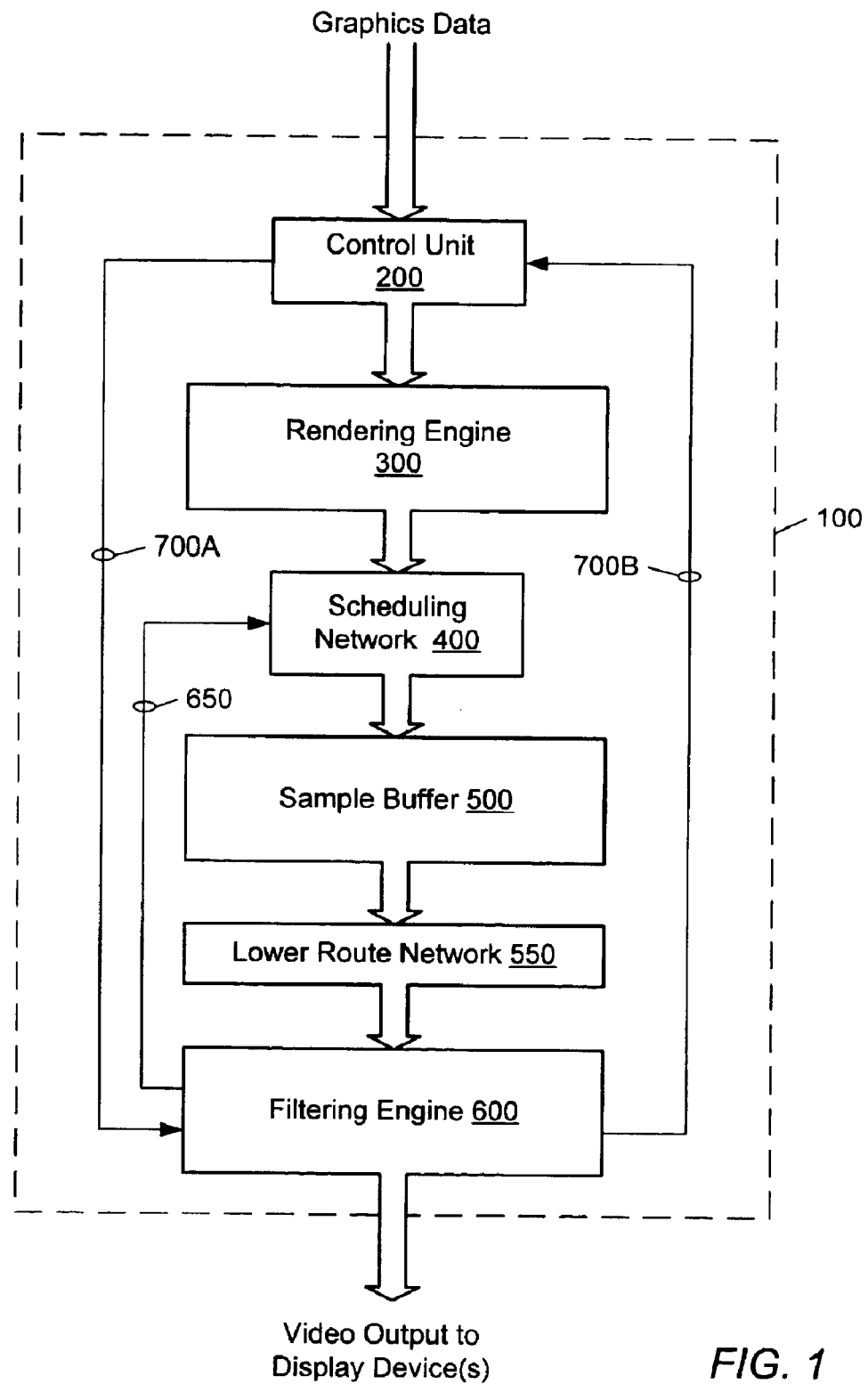
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
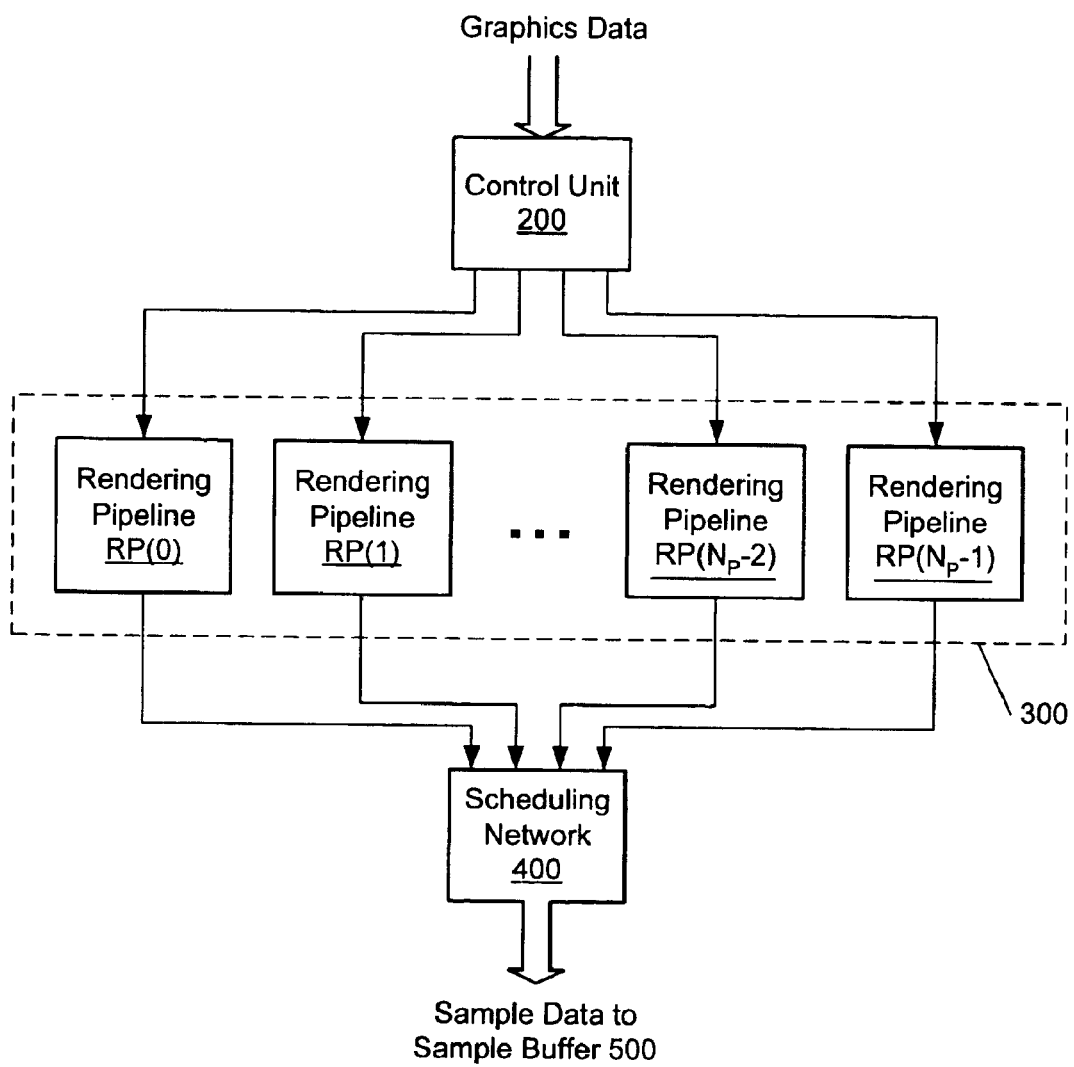
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$–1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), ..., VPS($N_D$–1), where $N_D$ is a positive integer. Thus, a set of host applications (running on a host computer) may send $N_D$ graphics data streams denoted GDS(0), GDS(1), ..., GDS($N_D$–1) to the graphics system 100. The rendering engine 300 may perform rendering computations on each graphics data stream GDS(I), for I=0, 1, 2, ..., $N_D$–1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
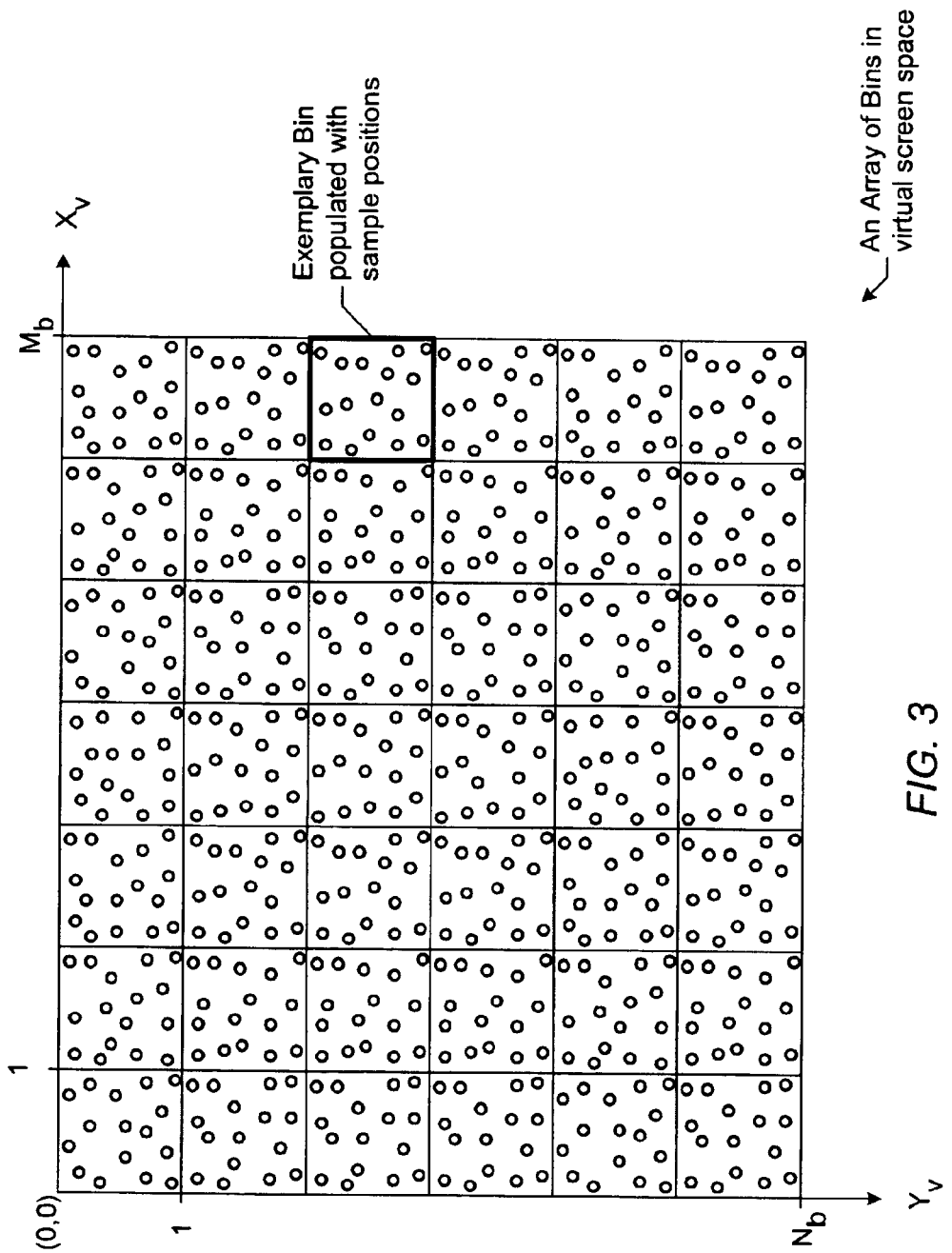
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
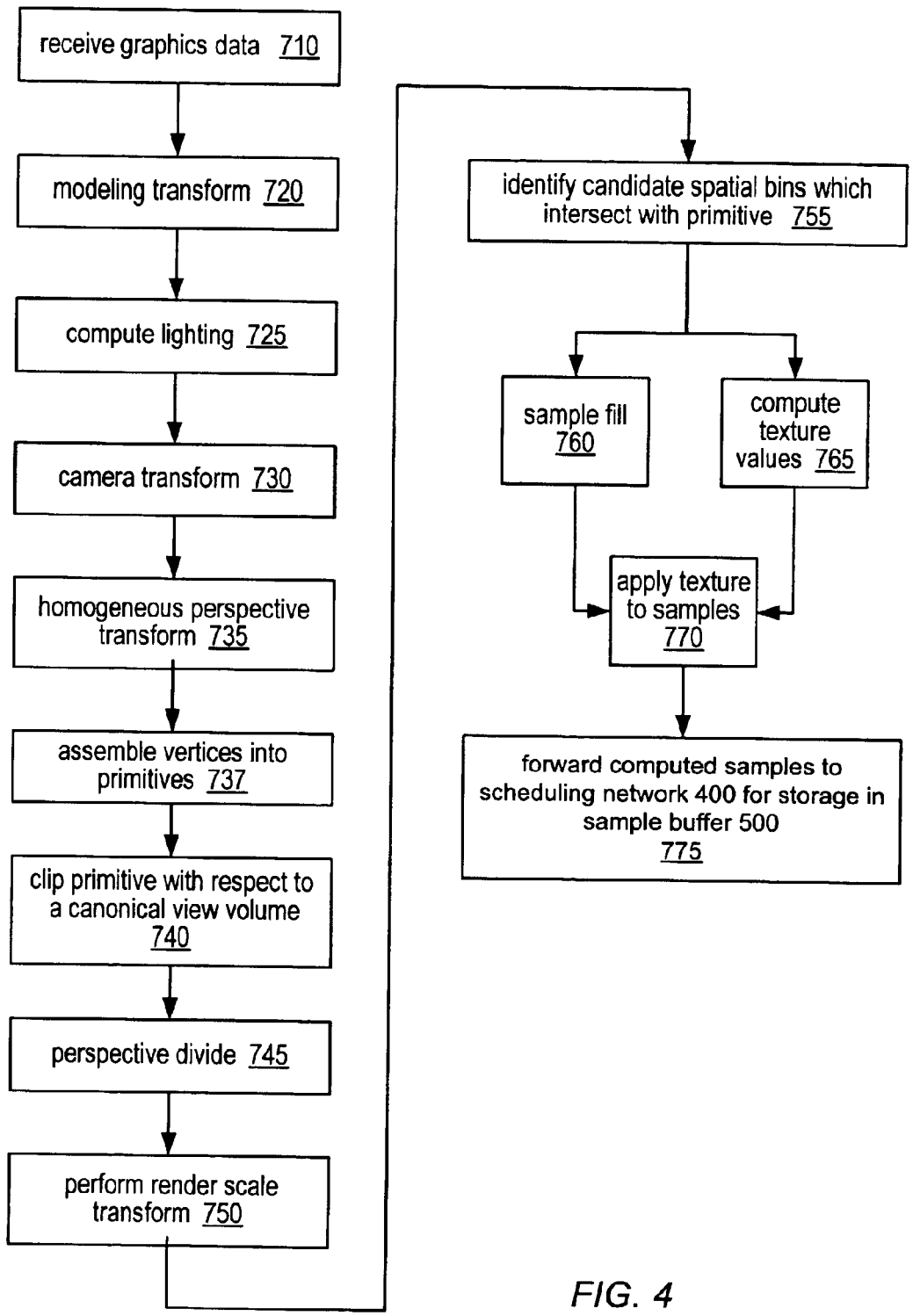
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1=(-W \leq X)$ $T2=(X \leq W)$ $T3=(-W \leq Y)$ $T4=(Y \leq W)$ $T5=(-W \leq Z)$ $T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations $x=X/W$ $y=Y/W$ $z=Z/W.$ After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
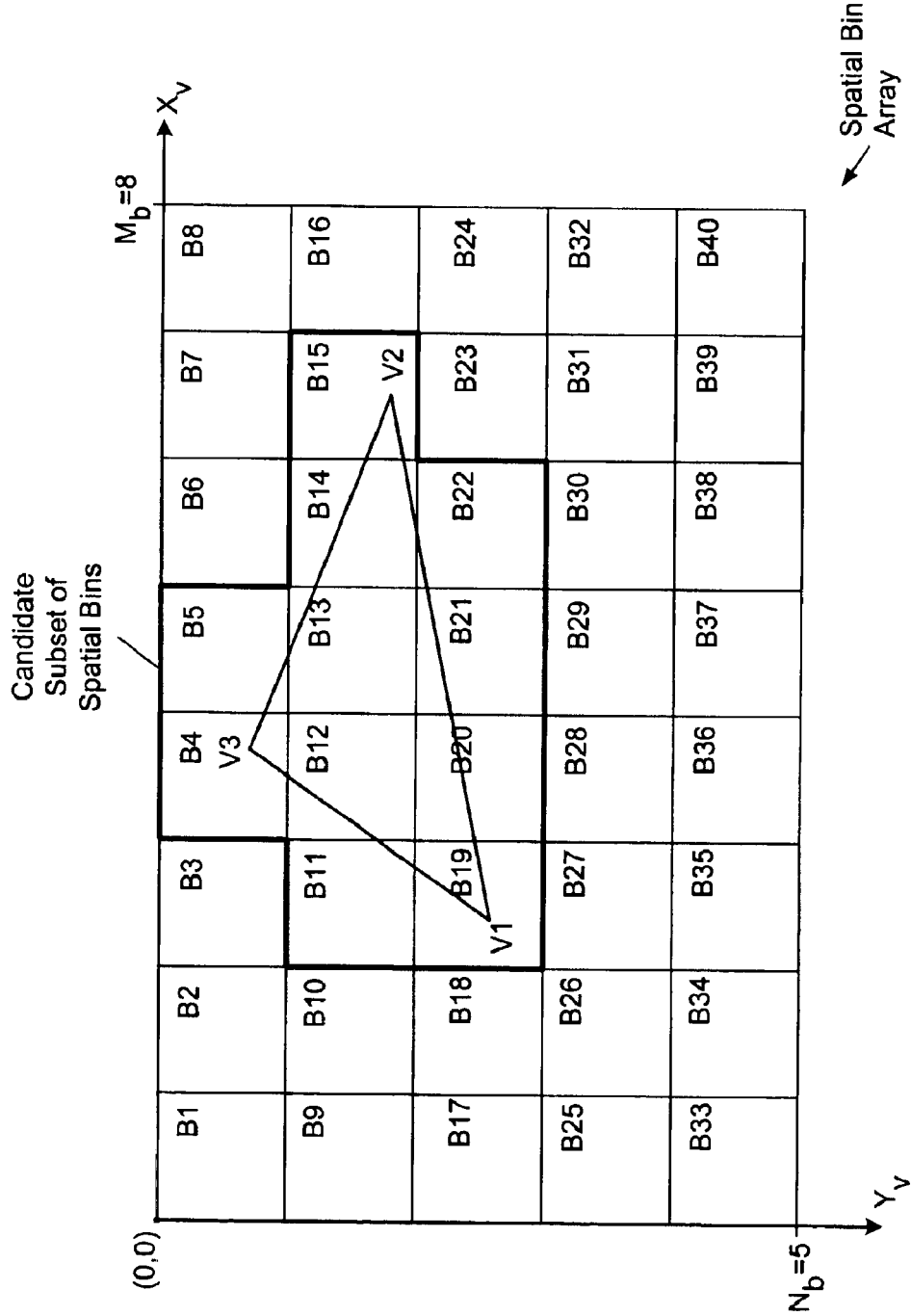
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
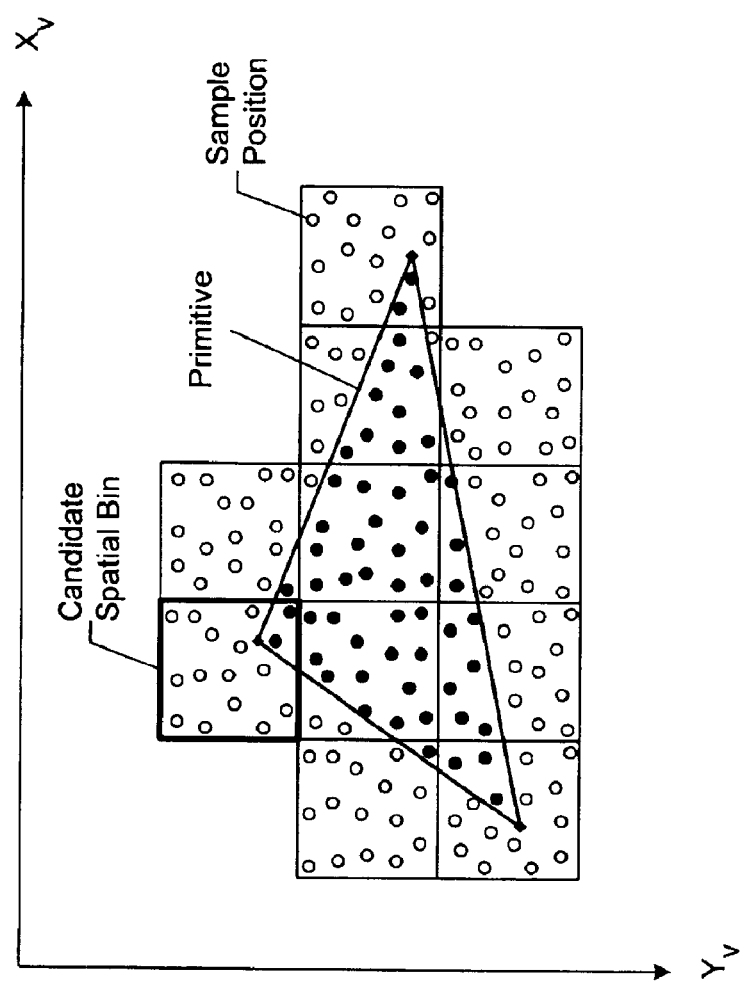
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
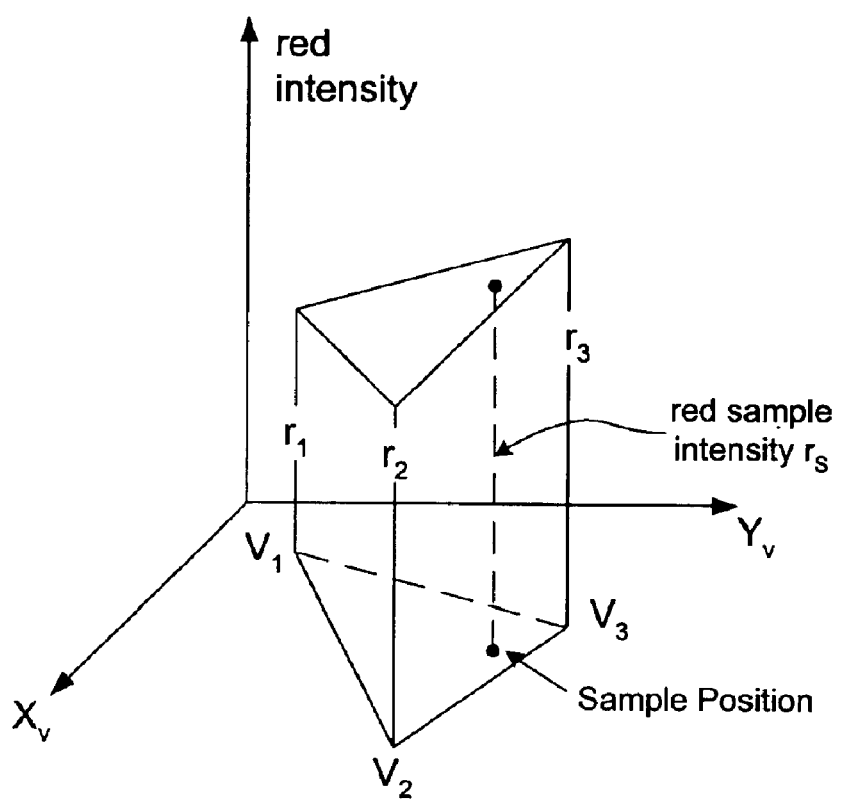
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
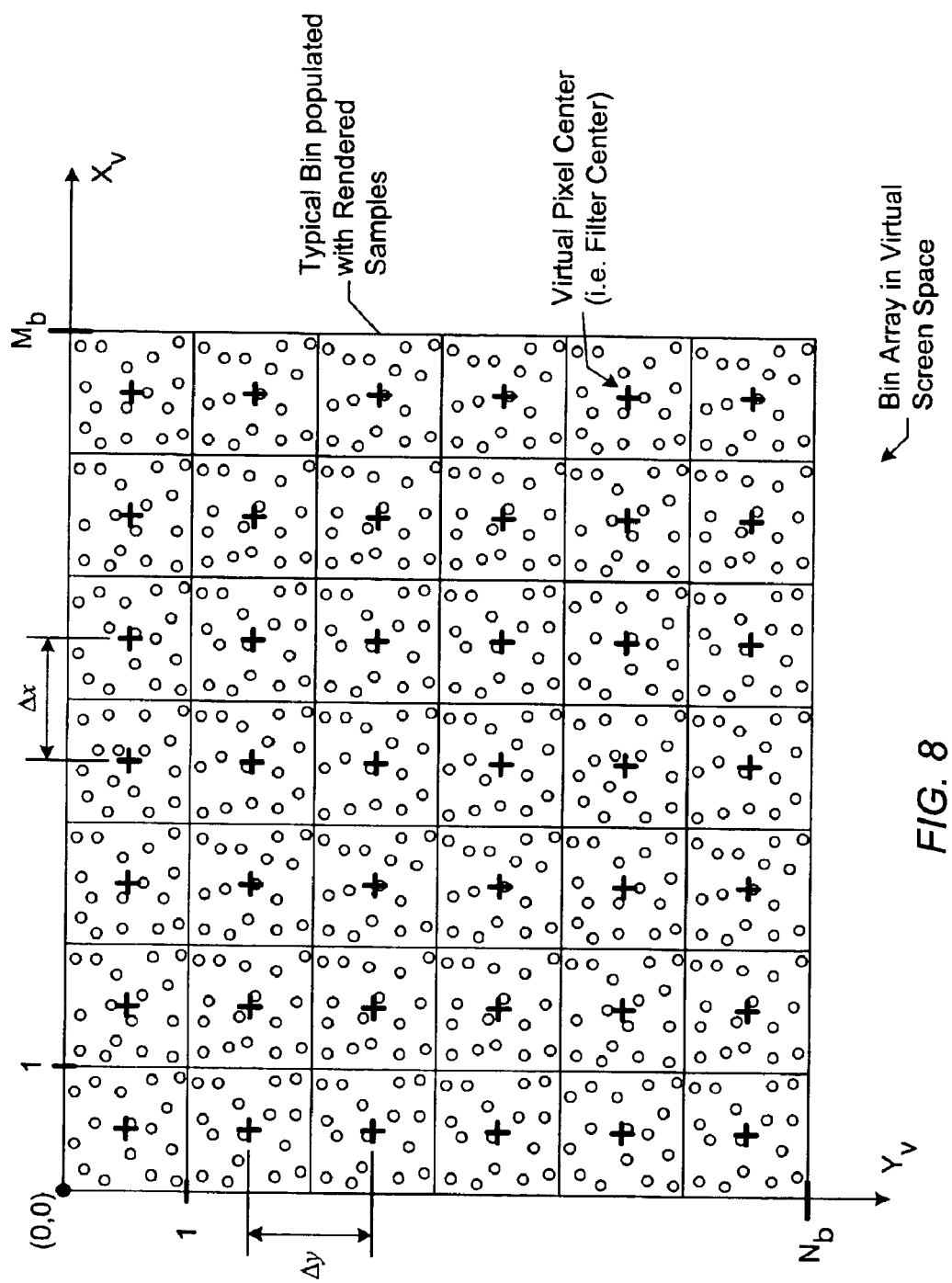
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
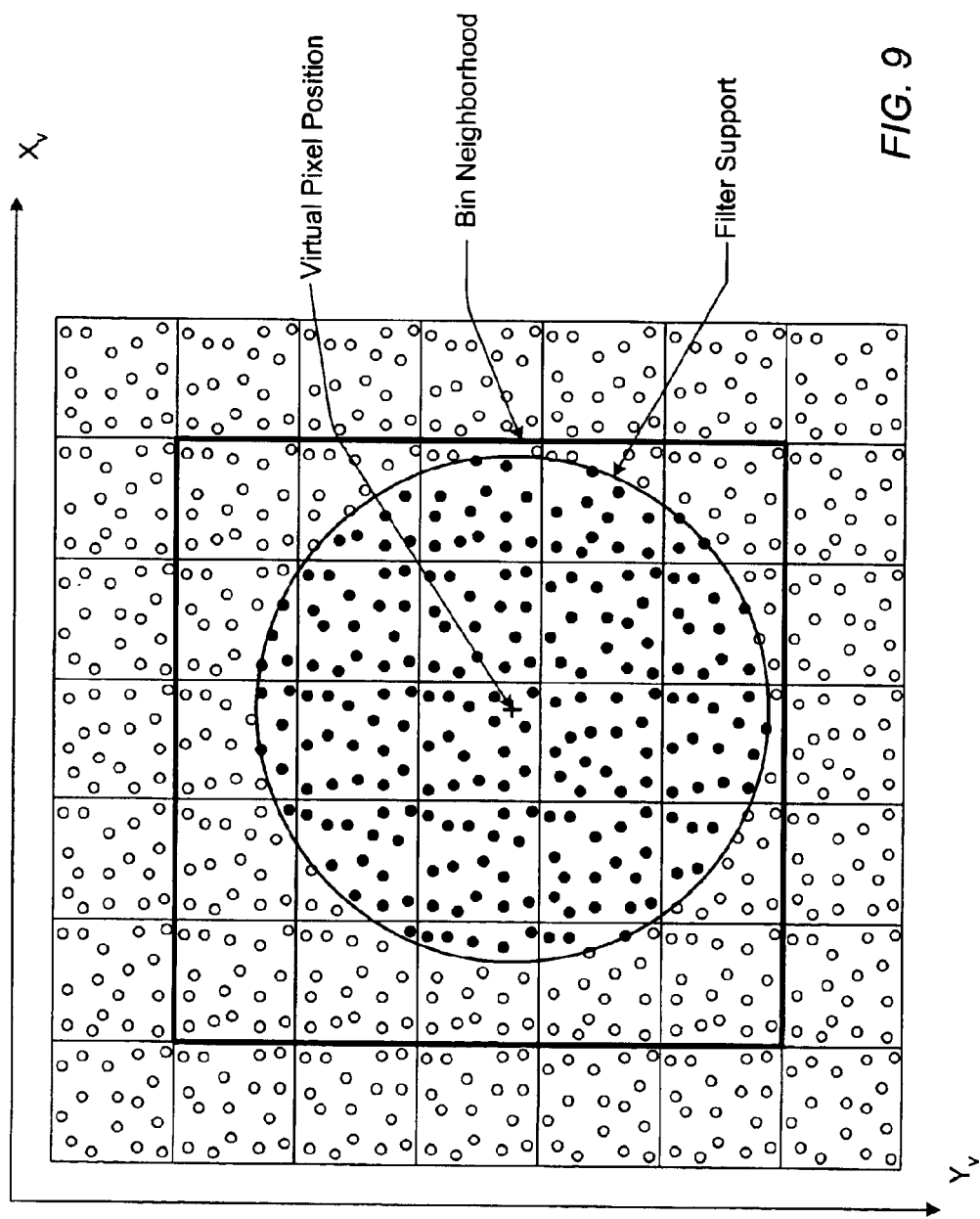
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S, Y_S)$ falls within the support square, i.e., if $X_P-R_f < X_S < X_P+R_f$ and $Y_P-R_f < Y_S < Y_P+R_f$.

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), ..., FU($N_f$-1) operating in parallel, where the number $N_f$ of filtering units is a positive integer. For example, in one embodiment, $N_f=4$. In another embodiment, $N_f=8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_p=X_start(K);
Y_p=Y_start(K);
while (J<N_p) {
    while (I < M_H(K) {
        Pixel Values = Filtration(X_p,Y_p);
        Send Pixel Values to Output Buffer;
        X_p = X_p+ΔX(K);
        I = I + 1;
    }
    X_p=X_start(K)
    Y_p=Y_p+ΔY(K);
    J=J+1;
}
```

The expression Filtration($X_P, Y_P$) represents the filtration of samples in the filter support region of the current virtual pixel position $(X_P, Y_P)$ to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
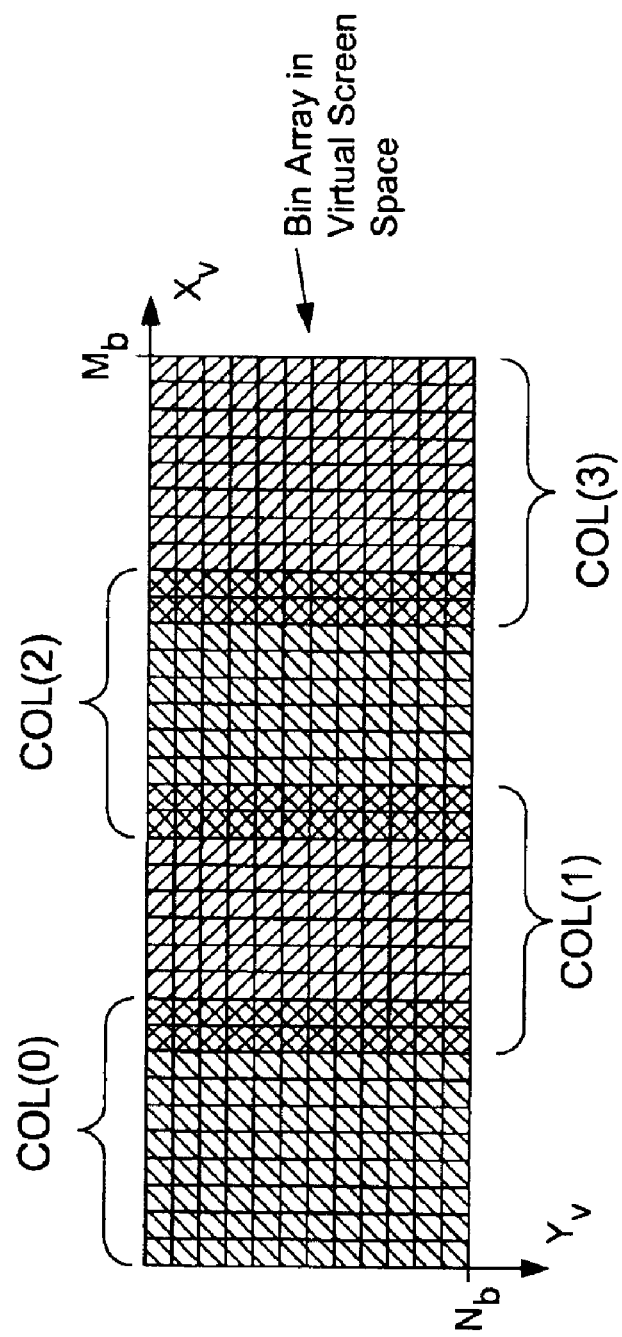
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins.

Note that column COL(K) may overlap with adjacent columns. This is a result of using a filter function with filter support that covers more than one spatial bin. Thus, the amount of overlap between adjacent columns may depend on the radius of the filter support.

Figure 11:
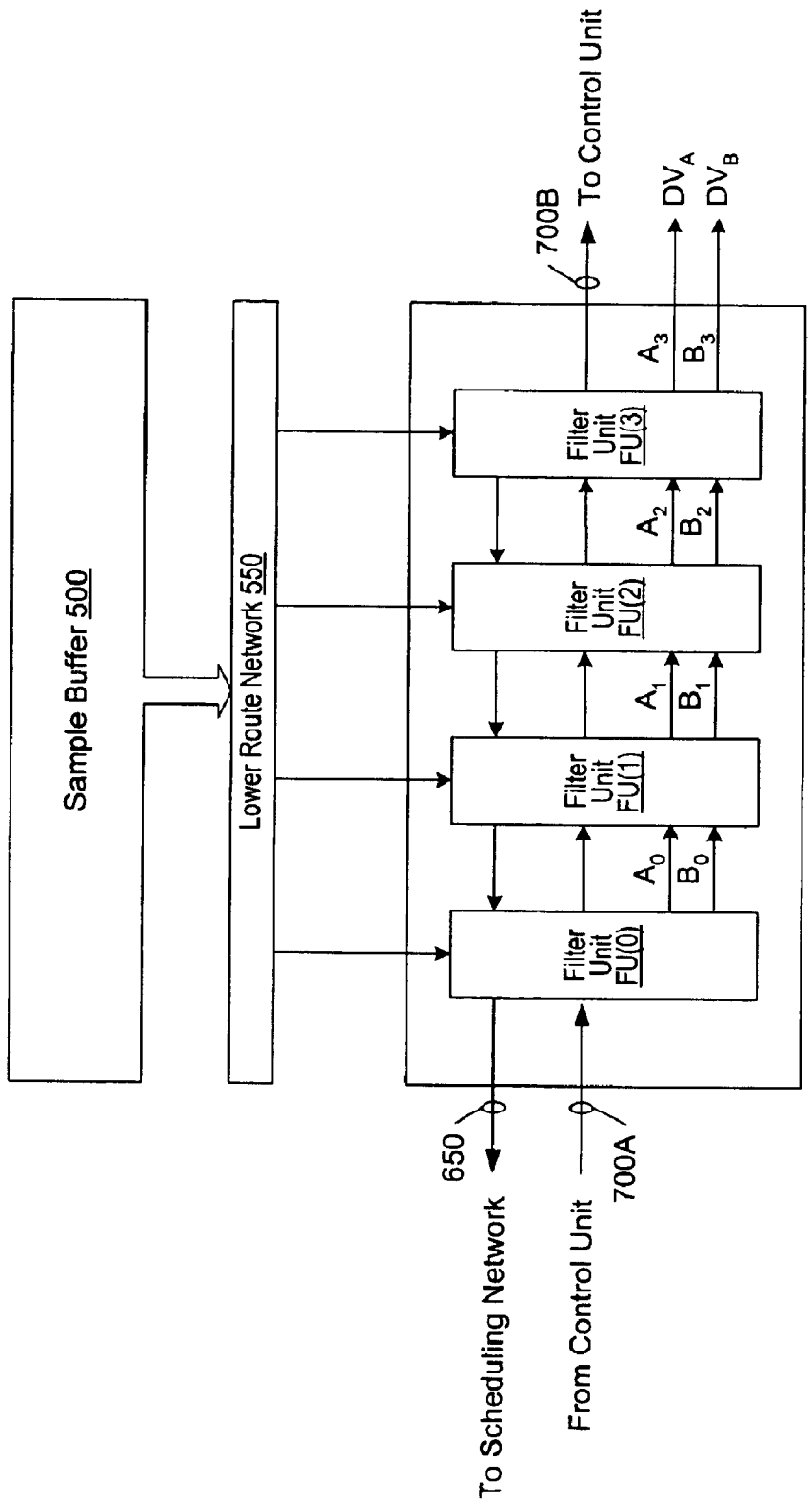
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$−1), each filtering unit FU(K) may be configured to receive digital video input streams $A_{K−1}$ and $B_{K−1}$ from a previous filtering unit FU(K−1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$−1) receives digital video streams $A_{Nf−2}$ and $B_{Nf−2}$ from the previous filtering unit FU($N_f$−2), and generates digital video output streams $A_{Nf−1}$ and $B_{Nf−1}$ also referred to as video streams $DV_A$ and $DV_B$ respectively. Video streams $A_0, A_1, \ldots, A_{Nf−1}$ are said to belong to video stream A. Similarly, video streams $B_0, B_1, \ldots, B_{Nf−1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K−1}$ with its locally computed pixel values. The resultant video stream $A_K$ is transmitted to the next filtering unit. The first filtering unit FU(0) may generate video streams $A_{−1}$ and $B_{−1}$ containing dummy pixels (e.g., pixels having a background color), and mix (or substitute) its computed pixel values into either video stream $A_{−1}$ or $B_{−1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
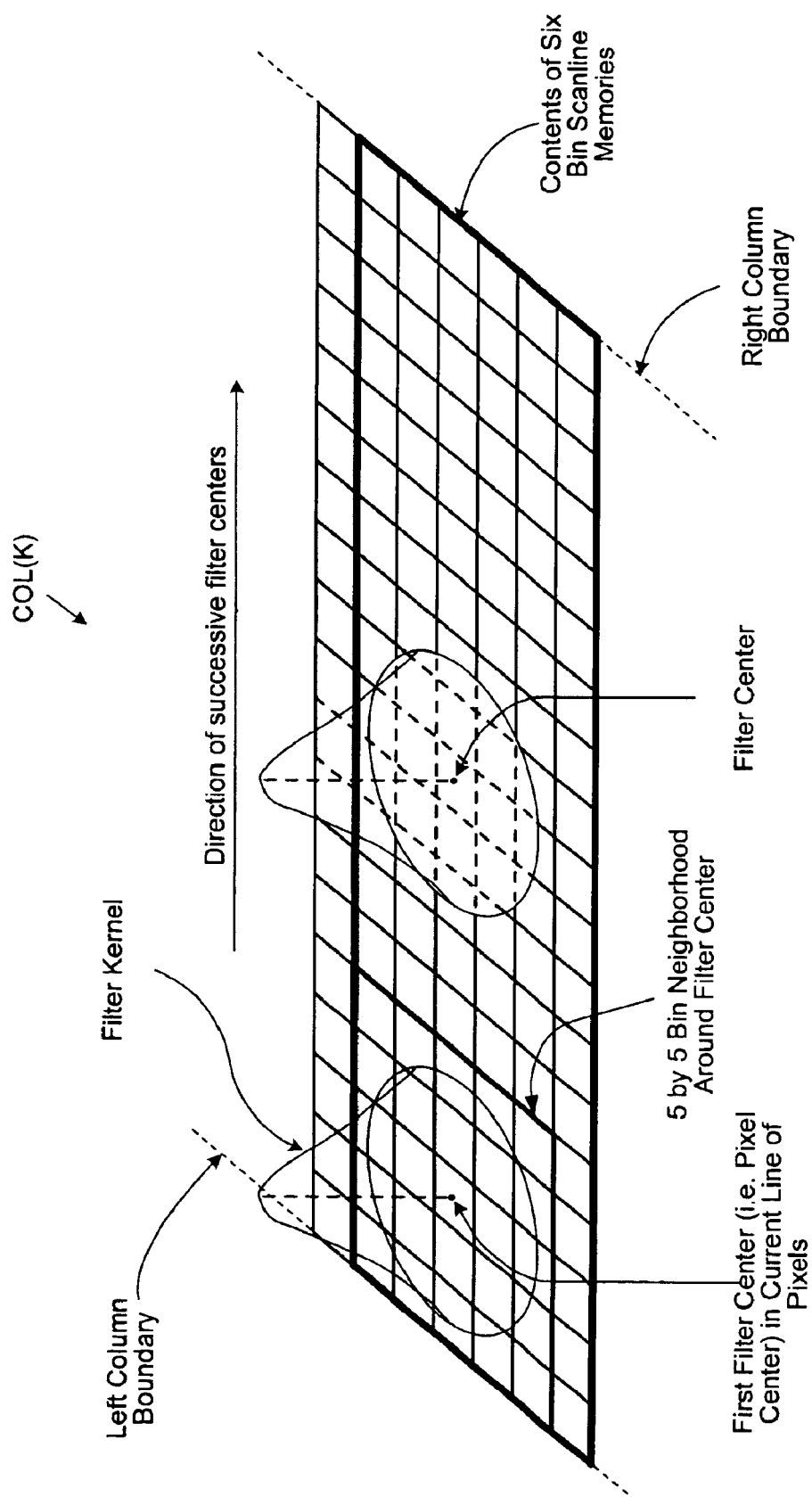
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one or more larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), ..., MB($N_{MB}$−1), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer), 30 bits of sample color (for back buffer), 16 bits of alpha and/or overlay, 10 bits of window ID, 26 bits of z depth, and 4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
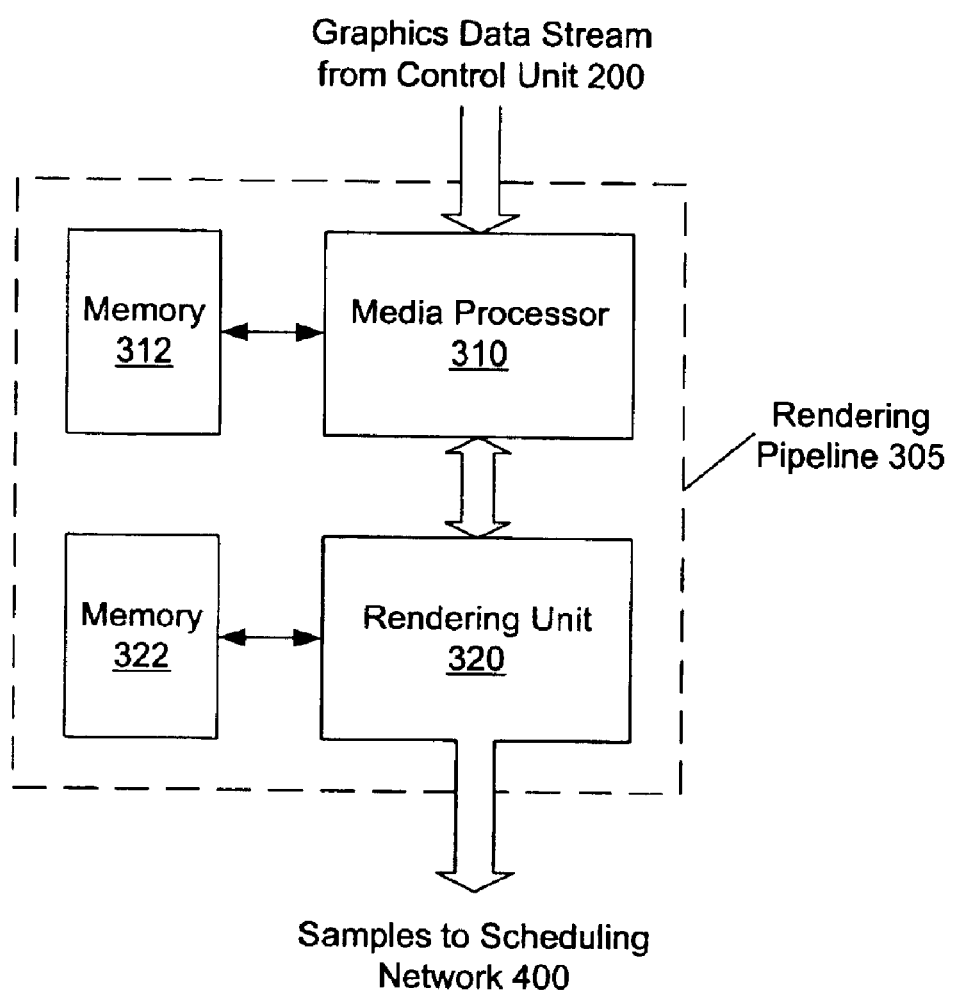
FIG. 13 illustrates one set of embodiments of a rendering pipeline comprising a media processor and a rendering unit.

As described above, the rendering engine 300 may include a set of rendering pipelines RP(0), RP(1), ..., RP($N_{PL}$−1). FIG. 13 illustrates one embodiment of a rendering pipeline 305 that may be used to implement each of the rendering pipelines RP(0), RP(1), ..., RP($N_{PL}$−1). The rendering pipeline 305 may include a media processor 310 and a rendering unit 320. (Media processor 310 is also referred to as geometry engine 310. See, e.g., FIG. 16.)

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
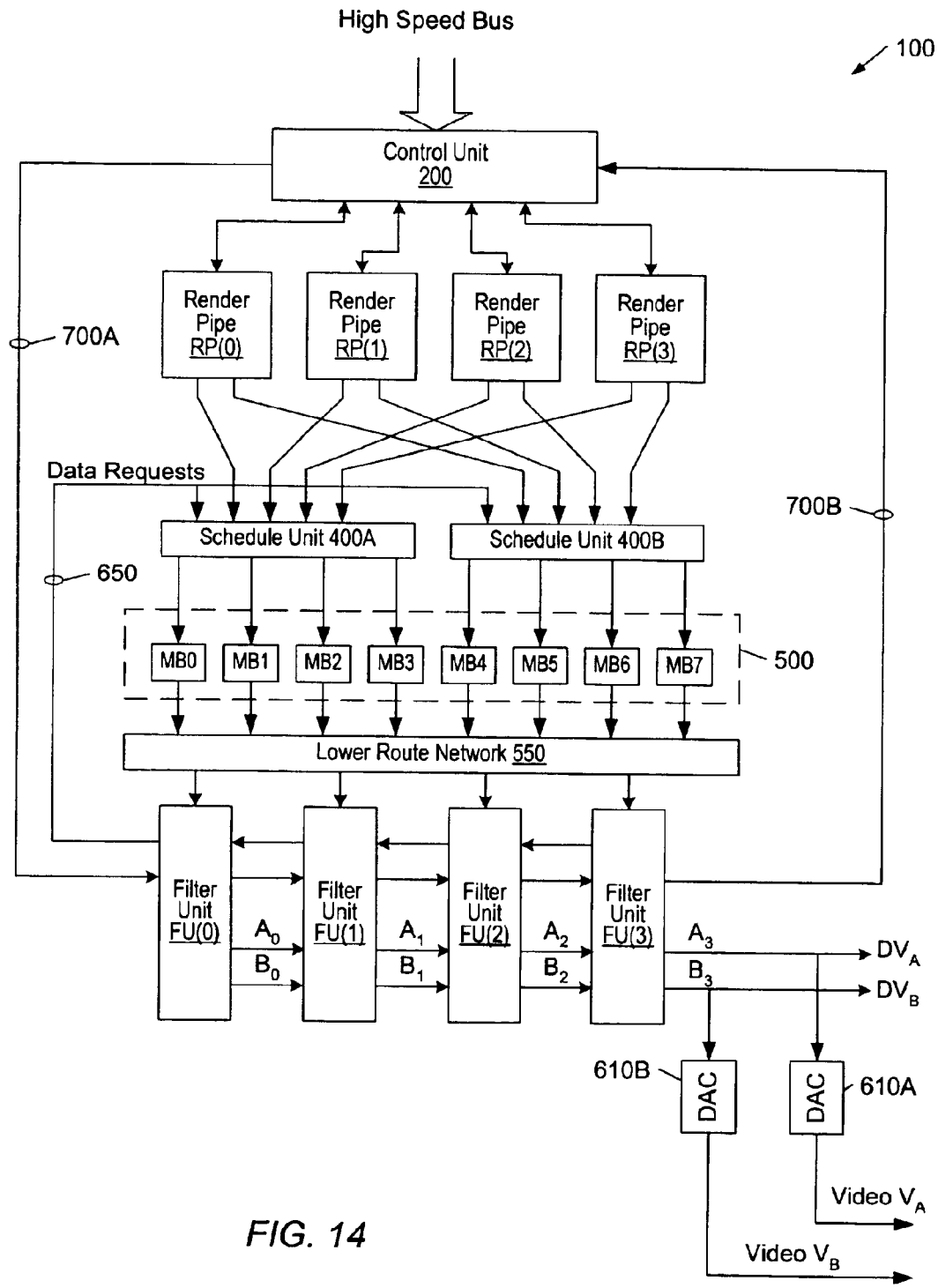
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
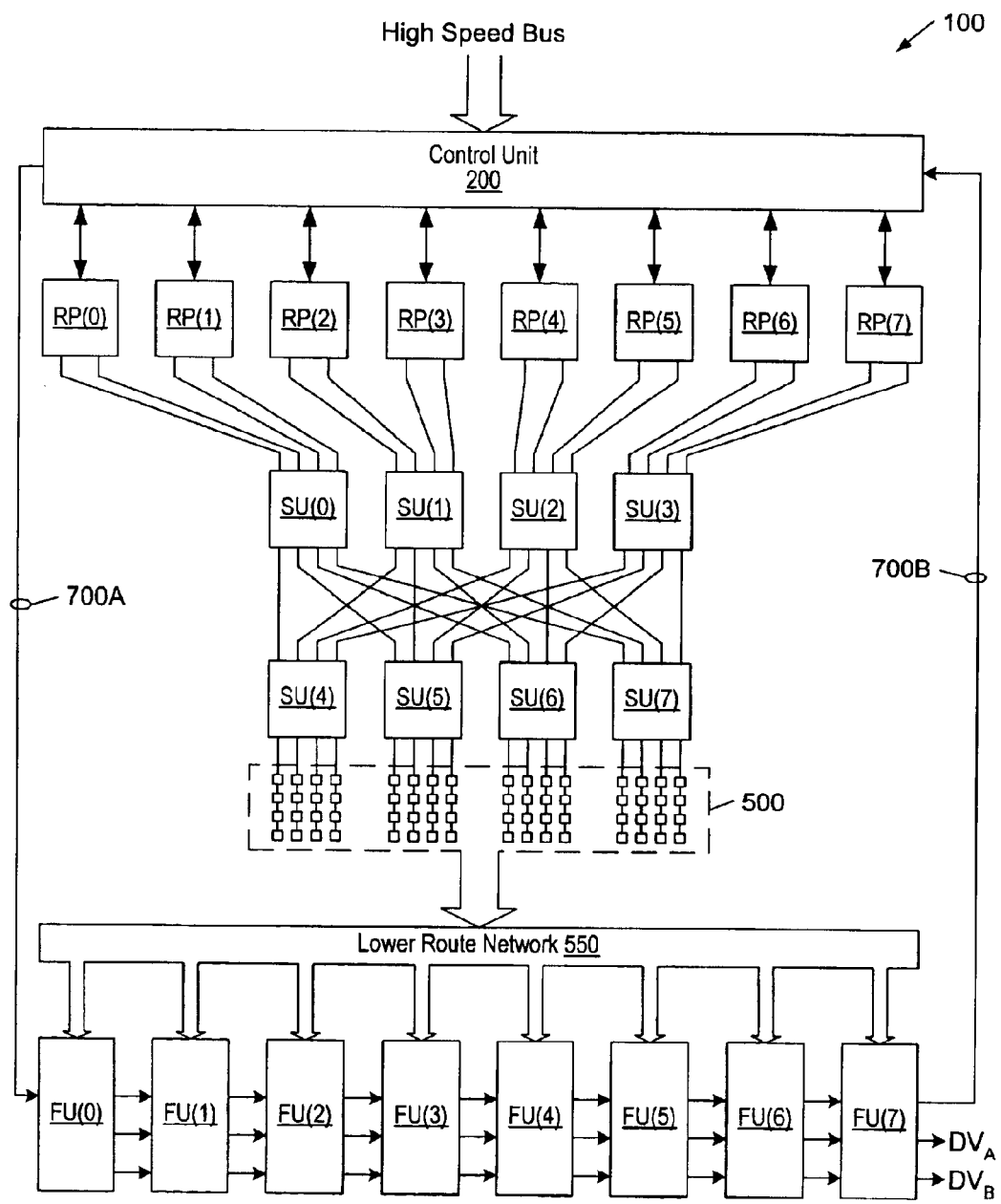
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Early Primitive Assembly—FIGS. 2, 13, 16, and 17

A multi-chip system and method for incorporating one or more first primitive assembly units in each of a set of one or more geometry chips in addition to one or more second primitive assembly units that may be incorporated in each of a set of one or more rasterization chips is illustrated in FIGS. 2, 13, 16, and 17. This system may allow per-primitive operations, such as clipping tests, to be performed in the geometry chips, and yet allow use of a per-vertex interface for sending vertex data to the rasterization chips. The one or more second primitive assemblers in the rasterization chip may then re-assemble vertices into triangles for rasterization.

Figure 16:
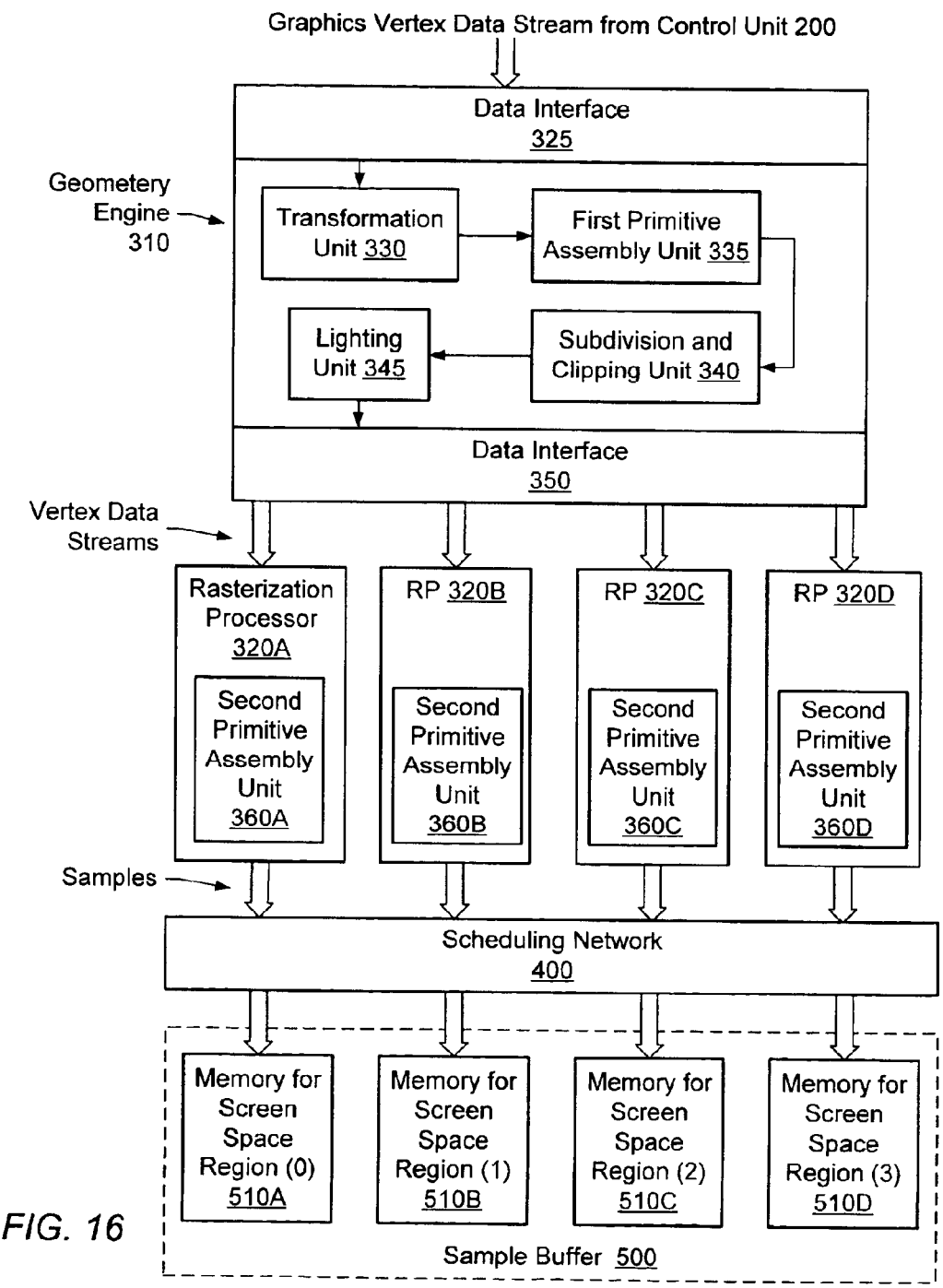
FIG. 16 illustrates a multi-chip rendering pipeline with primitive assembly units in each chip.

The multi-chip system may include a rendering engine 300 that incorporates one or more rendering pipelines, such as rendering pipeline 305 of FIG. 13. FIG. 16 illustrates one set of embodiments of rendering pipeline 305. The rendering pipeline 305 includes a geometry engine 310 and a set of rasterization processors 320A–D. The set of rasterization processors 320A–D realize rendering unit 320. The geometry engine 310 includes at least one first primitive assembly unit 335. The first primitive assembly unit 335 may assemble a first stream of vertices into first primitives. The geometry engine 310 may apply per-primitive operations on the first primitives to generate second primitives and output a second stream of vertex data comprising vertices of the second primitives. The geometry engine 310 may also include additional units to perform per-vertex operations, such as a transformation unit 330 and a lighting unit 345. The additional units may perform per-vertex operations on the vertices of the first stream and any new vertices of the second primitives. These additional units may be programmable. Per-primitive operations may include primitive clipping operations with respect to the edges of one or more screen space regions, a viewport, or one or more windows or stencils. The geometry engine 310 and each of the rasterization processors 320A–D may be an ASIC. (ASIC is also referred to herein as a chip.)

The rasterization processors 320A–D may include one or more second primitive assembly units 360A–D. The second primitive assembly units may re-assemble the second primitives from the second stream of vertices. The rasterization processors 320A–D may also receive the second stream of vertices, rasterize the second primitives to generate sample data, and output the sample data to a memory. The sample data may be usable to determine a displayable image.

Figure 17:
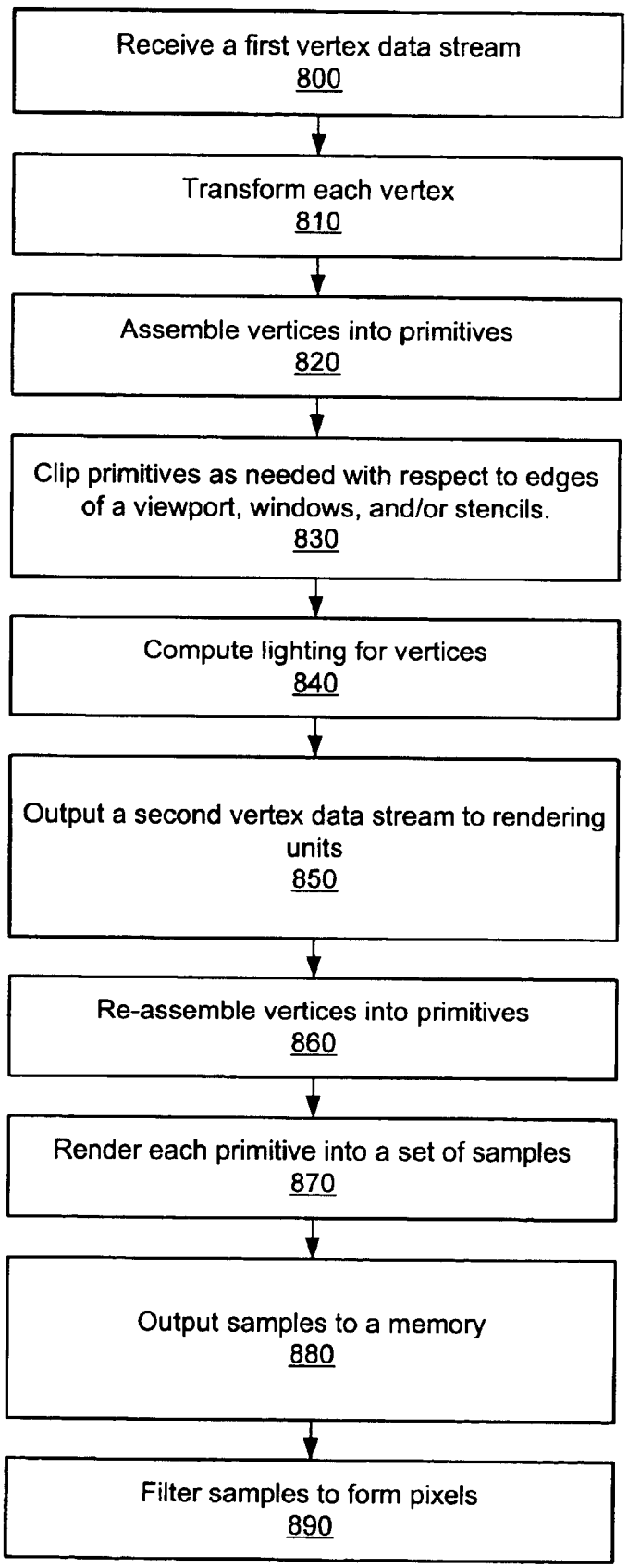
FIG. 17 provides a flowchart of a method for rendering graphics data utilizing primitive assembly units in each chip of the rendering pipeline.

The flowchart of FIG. 17 illustrates one set of embodiments of a method for rendering primitives utilizing a first set one or more primitive assembly units such as primitive assembly unit 335 in each of one or more geometry engines such as geometry engine 310 and a second set of one or more primitive assembly units such as primitive assembly units 360A–D in one or more rasterization processors such as rasterization processors 320A–D. The method incorporates multiple steps including:

receiving a first vertex data stream (step 800), performing a set of per-vertex operations on the vertices of the first vertex data stream, such as transformation (step 810), assembling vertices from the first vertex data stream into a sequence of first primitives (step 820), performing a set of per-primitive operations such as clipping or subdivision on the first primitives to produce a sequence of second primitives, (step 830), performing a set of per-vertex operations such as lighting and transformation on the vertices of the sequence of second primitives, (step 840), outputting a second vertex data stream corresponding to the vertices of the sequence of second primitives to one or more rasterization processors 320A–D (step 850), re-assembling the vertices of the second vertex data stream into the sequence of second primitives (step 860), rasterizing each of the second primitives into samples (step 870), outputting the samples to a memory (step 880), and filtering the samples into pixels (step 890) and outputting the pixels to a display unit. Steps 860 and 870 may occur in the rasterization processors 320A–D. In some of the embodiments, the order of the steps described above may vary.

The method may also utilize geometry compression of vertices to reduce the average amount of input data per primitive in the first and second streams of vertex data. Geometry compression provides a means for sending data for a vertex only once, even if it resides in more than one primitive.

Figure 18:
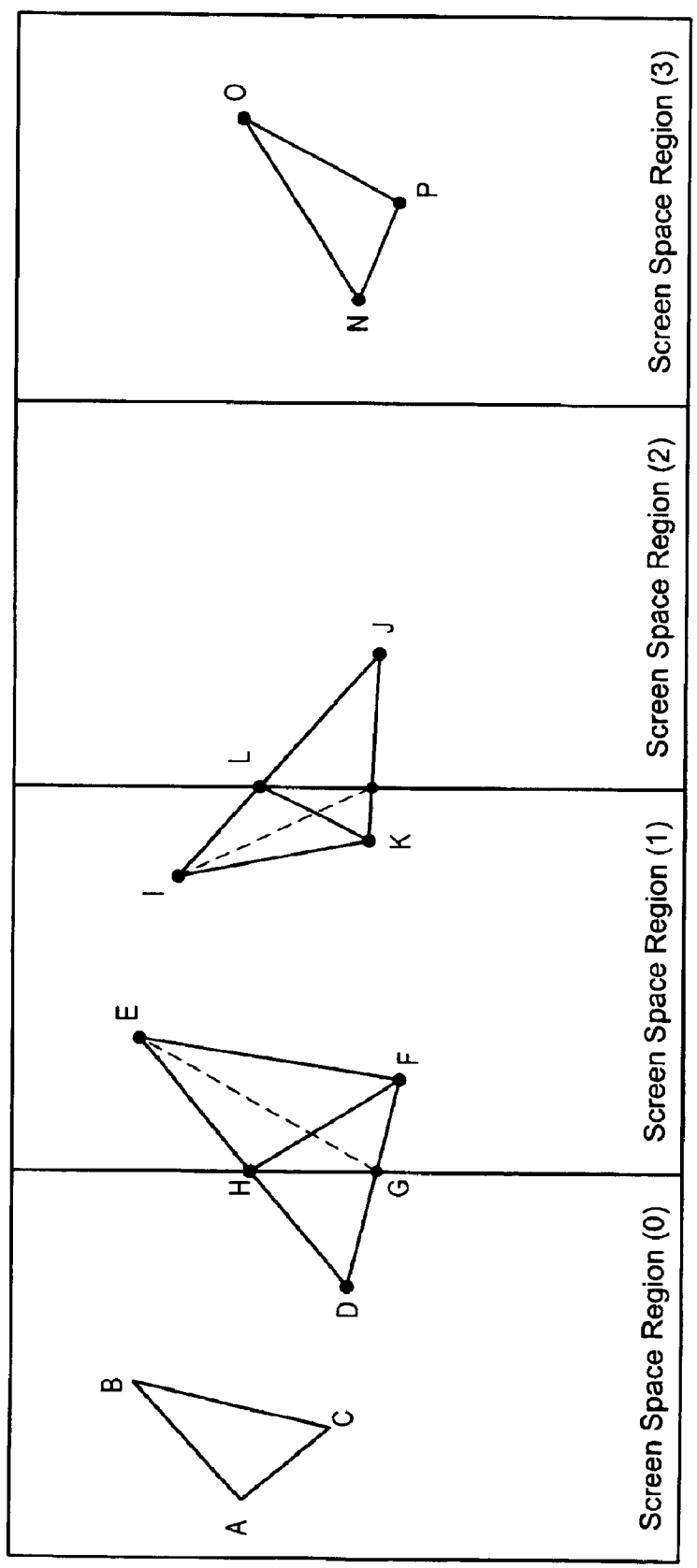
FIG. 18 illustrates a method of primitive sub-division with respect to defined screen space regions.
Figure 19:
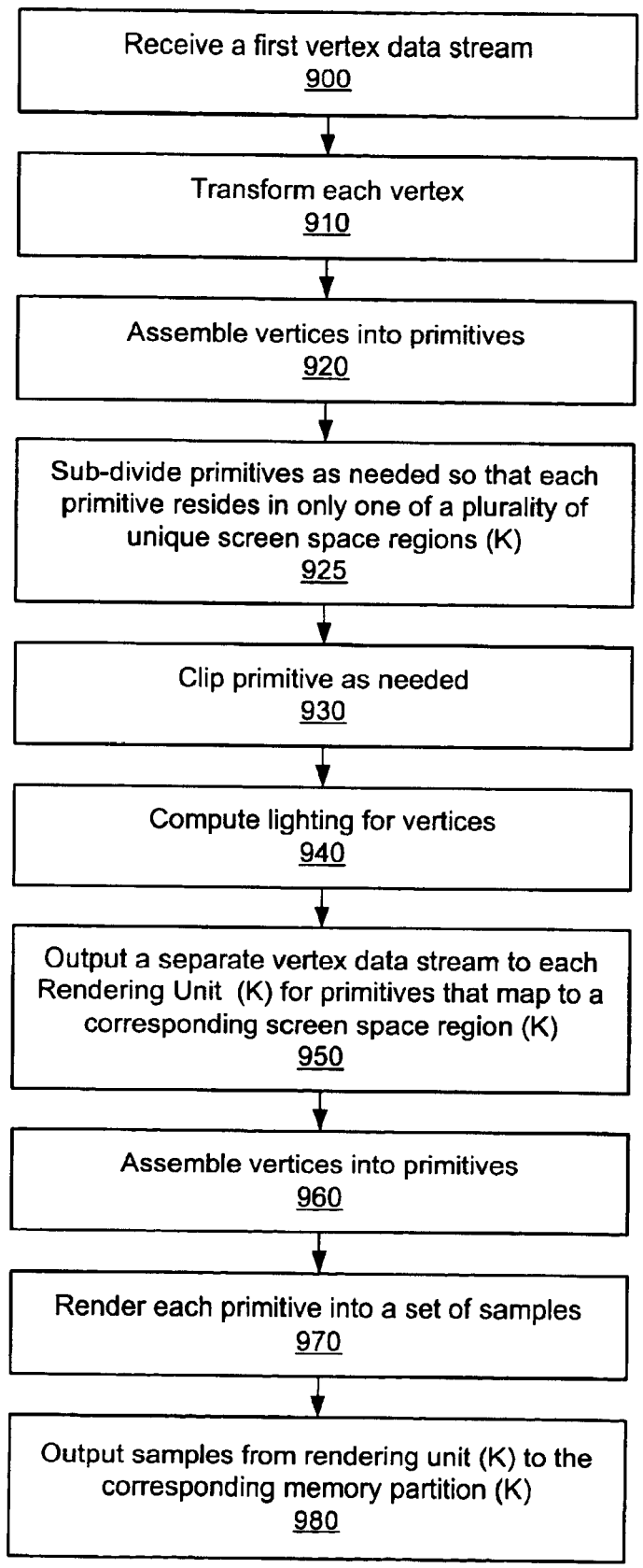
FIG. 19 provides a flowchart of a method for rendering graphics data utilizing primitive assembly units in each chip of the rendering pipeline and separately processing the primitives that reside in a defined screen space region.

Screen-Space Culling—FIGS. 16, 18, and 19

In another set of embodiments, the geometry chip 310 may test an assembled primitive against the projected boundaries of a set of screen space regions, where each region is assigned to one of the rasterization chips 320A–D. Those primitives residing in more than one region may be sub-divided into two or more new primitives so that each new primitive resides in only one screen space region. The geometry chip 310 may then send the vertex data for each primitive to the corresponding rasterization chip 320A–D.

FIG. 18 illustrates this process with four large triangles that have been transformed to screen space. Triangles ABC and NOP do not need to be sub-divided because they reside within a defined screen space region. Each of the triangles DEF and IJK reside within two defined screen space regions. Triangles DEF and IJK may each be sub-divided into two possible sets of three triangles, where each new triangle resides in a single defined screen space region.

A multi-chip system that may utilize this process is illustrated in FIG. 16. The system may include a plurality of rasterization processors 320A–D (where each of the rasterization processors 320A–D renders primitives for an assigned screen space region, and where each assigned screen space region is one of a plurality of specified non-overlapping screen space regions) and one or more geometry engines (such as geometry engine 310) coupled to the plurality of rasterization processors 320A–D.

A geometry engine 310 may assemble vertices from a first vertex data stream into primitives; sub-divide each primitive into two or more new primitives, if the primitive maps onto more than one screen space region, where each of the new primitives maps onto one screen space region; and output a different vertex data stream to each rasterization processor 320A–D, where each vertex data stream comprises vertices from primitives that map onto the corresponding screen space region assigned to the receiving rasterization processor.

Each rasterization processor 320A–D may receive vertices corresponding to its assigned screen space region, assemble the vertices into primitives, render the primitives into samples, and output the samples to a corresponding one of memories 510A–D also serving the assigned screen space region.

The system may also include one or more filtration units, wherein the filtration units are operable to determine pixels from a set of samples. Each of the rasterization processors 320A–D may incorporate a plurality of rendering pipelines or may represent a plurality of rendering units, and each rendering pipeline may include one or more primitive assembly units 360. The geometry engine 310 may also include one or more primitive assembly units 360. The geometry engine 310 may receive a first stream of vertex data from a control unit 200 and may perform a set of per-vertex operations on the vertices of the first stream and a set of per-primitive operations on primitives assembled from the vertices.

The flowchart of FIG. 19 illustrates one set of embodiments of a method for rendering primitives utilizing a first set of primitive assembly units 335 in one or more geometry chips 310 and a second set of primitive assembly units 360A–D in one or more rasterization chips 320A–D. The geometry chips 310 output separate vertex data streams to each of the rasterization chips 320A–D, where each vertex data stream includes primitives for one defined screen space region that is assigned to the corresponding rasterization chip. Each rasterization chip outputs sample data to a memory that may be dedicated to sample data for the defined screen space region assigned to the rasterization chip. (Note—there may be multiple regions per rendering unit, or multiple rendering units per region, or a combination of both in a graphics system. Also note—the use of A–D is meant to suggest a plurality of units, not just 4 units)

The method incorporates multiple steps including one or more of:

receiving a first vertex data stream (step 900), performing a set of per-vertex operations such as transformation on the vertices of the first vertex data stream, (step 910), assembling vertices from the first vertex data stream into a sequence of first primitives (step 920), sub-dividing a first primitive, with respect to boundaries of a set of specified screen space regions, into two or more new primitives if the first primitive projects onto more than one of the set of specified screen space regions, where each of the new primitives resides in only one of the specified screen space regions (step 925), performing a set of per-primitive operations such as clipping on the first primitives to produce a sequence of second primitives (step 930), performing a set of per-vertex operations such as lighting and transformation on the vertices of the sequence of second primitives, (step 940), outputting a vertex data stream (K) to each rasterization processor (K) of rasterization processors 320A–D corresponding to the vertices of the second primitives that map to a corresponding screen space region (K) (step 950), re-assembling the vertices of each vertex data stream (K) into a sequence of second primitives (step 960), rasterizing the second primitives into samples (step 970), and outputting the samples from rendering unit (K) to a memory (K) of memories 510A–D (step 980).

Each of the vertex data streams (K) (also referred to herein as regional vertex data streams) includes vertices from a portion of the second primitives. A portion may range from 0% to 100% of the second primitives.

Numerous variations and modifications will become apparent to those skilled in the art once the above disclosure is fully appreciated. It is intended that the following claims be interpreted to embrace all such variations and modifications.

What is claimed is:

1. A system comprising:

a geometry engine comprising at least one first primitive assembly unit, wherein the first primitive assembly unit is operable to assemble a first stream of vertices into first primitives, and wherein the geometry engine is operable to apply per-primitive operations on the first primitives to generate second primitives and to output a second stream of compressed geometry vertices comprising vertices of the second primitives; and a rasterization processor comprising at least one second primitive assembly unit, wherein the rasterization processor is operable to receive the second stream of compressed geometry vertices, and wherein the second primitive assembly unit is operable to re-assemble the second stream of compressed geometry vertices into second primitives.

2. The system of claim 1, wherein the geometry engine is further operable to:
apply per-vertex operations to the vertices of the first stream, and
apply per-vertex operations to any new vertices of the second primitives;

and wherein the rasterization processor is further operable to:
receive the second stream of compressed geometry vertices,
rasterize the second primitives to generate sample data, and
output the sample data to a memory.

3. The system of claim 2, wherein the sample data is usable to determine a displayable image.

4. The system of claim 1, wherein the first stream of vertices utilizes compressed geometry to reduce the average amount of input data per primitive.

5. The system of claim 1, further comprising one or more data buses, wherein the data buses connect the geometry engine to the rasterization processor, and wherein the geometry engine and the rasterization processor are separate integrated circuit chips.

6. A system comprising:

one or more geometry engines and one or more rasterization processors;

wherein the geometry engines are configured to:
receive a first stream of vertices,
apply per-vertex operations to the vertices of the first stream,
assemble the vertices of the first stream into first primitives,
apply per-primitive operations on the first primitives to generate second primitives,
apply per-vertex operations to any new vertices of the second primitives, and
send a second stream of compressed geometry vertices comprising vertices of the second primitives to the rasterization processors;

and wherein the rasterization processors are configured to:
receive the second stream of compressed geometry vertices,
assemble the vertices of the second stream so as to regenerate the second primitives;
rasterize the second primitives to generate sample data, and
output the sample data to a memory.

7. The system of claim 6, wherein each geometry engine comprises one or more primitive assembly units.

8. The system of claim 6, wherein each rasterization processor comprises one or more primitive assembly units.

9. The system of claim 6, wherein each rasterization processor comprises one or more rendering pipelines, and wherein each rendering pipeline comprises one or more primitive assembly units.

10. The system of claim 6, wherein the per-vertex operations comprise a programmable lighting operation.

11. The system of claim 6, wherein the per-vertex operations comprise transformation operations.

12. The system of claim 6, wherein the per-primitive operations comprise primitive clipping operations with respect to the edges of a screen, a viewport, a window, or a stencil.

13. The system of claim 6, wherein each of the rasterization processors renders primitives for an assigned screen space region, wherein each assigned screen space region is one of a plurality of specified non-overlapping screen space regions; and wherein the geometry engine is configured to:
sub-divide each first primitive, if the first primitive maps onto more than one screen space region, into two or more new primitives, wherein each of the new primitives maps onto one screen space region; and
output a different vertex data stream to each rasterization processor, wherein a vertex data stream comprises vertices from primitives that map onto the corresponding screen space region assigned to the receiving rasterization processor.

14. The system of claim 13, wherein each rasterization processor is configured to:
receive vertices corresponding to the assigned screen space region;
assemble the vertices into primitives;
render the primitives into samples; and
output the samples to a memory corresponding to the assigned screen space region.

15. A method comprising:
in one or more geometry engines:
assembling vertices from a first vertex data stream into a sequence of first primitives;
performing a set of per-primitive operations on the first primitives to produce a sequence of second primitives;
outputting a second compressed geometry vertex data stream corresponding to the vertices of the sequence of second primitives to one or more rasterization processors; and
re-assembling the vertices of the second compressed geometry vertex data stream into the sequence of second primitives in each of the one or more rasterization processors.

16. The method of claim 15, further comprising:
performing a set of per-vertex operations on the vertices of the first vertex data stream and on the vertices of the sequence of second primitives in the one or more geometry engines;
rasterizing the second primitives into samples in the one or more rasterization processors; and
outputting the samples to a memory.

17. The method of claim 16, further comprising filtering the samples into pixels and outputting the pixels to a display unit.

18. The method of claim 15, wherein the first vertex data stream utilizes compressed geometry to reduce the average amount of input data per primitive.

19. The method of claim 15, wherein said outputting to one or more rasterization processors utilizes one or more data buses that connect each geometry engine to one or more of the rasterization processors, and wherein each geometry engine and each rasterization processor is a separate integrated circuit chip.

20. A system comprising:
means for assembling vertices from a first vertex data stream into a sequence of first primitives;
means for performing a set of per-primitive operations on the first primitives to produce a sequence of second primitives;
means for outputting a second compressed geometry vertex data stream corresponding to the vertices of the sequence of second primitives to one or more rasterization processors, and
means for re-assembling the second primitives from the second compressed geometry vertex data stream in each rasterization processor.

21. The system of claim 20, further comprising:
means for performing a set of per-vertex operations on the vertices of the first vertex data stream;
means for performing a set of per-vertex operations on any new vertex of the sequence of second primitives;
means for rasterizing the second primitives into samples; and
means for outputting the samples to a memory.

22. A method comprising:
assembling transformed vertices in one or more geometry engines from a first vertex data stream into a sequence of first primitives, wherein if a first primitive projects onto more than one of a set of specified screen space regions, the primitive is sub-divided with respect to boundaries between the specified screen space regions into two or more new first primitives;
performing a set of per-primitive operations on the first primitives to produce a sequence of second primitives;
outputting a plurality of different compressed geometry regional vertex data streams, wherein a regional vertex data stream contains vertex data for those vertices that reside in a particular one of the specified screen space regions, and wherein each of the regional vertex data streams comprises vertices from a portion of the second primitives; and
re-assembling the vertices of each compressed geometry regional vertex data stream into regional second primitives in a corresponding rasterization processor that is separate from the one or more geometry engines.

* * * * *